(12) United States Patent
Suto

(10) Patent No.: US 9,908,197 B2
(45) Date of Patent: Mar. 6, 2018

(54) WIRE BUTT WELDER WITH ADJUSTABLE ALIGNMENT

(71) Applicant: Automated Industrial Machinery, Inc., Addison, IL (US)

(72) Inventor: Tony Suto, St. Charles, IL (US)

(73) Assignee: Automated Industrial Machinery, Inc., Addison, IL (US)

(*) Notice: Subject to any disclaimer, the term of this patent is extended or adjusted under 35 U.S.C. 154(b) by 762 days.

(21) Appl. No.: 14/211,687

(22) Filed: Mar. 14, 2014

(65) Prior Publication Data

US 2014/0263198 A1 Sep. 18, 2014

Related U.S. Application Data

(60) Provisional application No. 61/791,371, filed on Mar. 15, 2013.

(51) Int. Cl.
| | |
|---|---|
| *B23K 11/02* | (2006.01) |
| *B23K 11/00* | (2006.01) |
| *B23K 11/16* | (2006.01) |
| *B23K 101/32* | (2006.01) |
| *B23K 103/04* | (2006.01) |

(52) U.S. Cl.
CPC .......... *B23K 11/02* (2013.01); *B23K 11/0026* (2013.01); *B23K 11/16* (2013.01); *B23K 2201/32* (2013.01); *B23K 2203/04* (2013.01)

(58) Field of Classification Search
CPC .... B23K 11/02; B23K 37/04; B23K 37/0426; B23K 37/0435; B23K 37/047; B23K 37/053; B23Q 3/064
USPC .............. 219/56, 57, 101, 121.82; 228/44.5; 269/60
See application file for complete search history.

(56) References Cited

U.S. PATENT DOCUMENTS

| | | | | |
|---|---|---|---|---|
| 1,875,761 | A | * | 9/1932 | Power ................ B23K 37/0435 269/243 |
| 2,288,494 | A | | 6/1942 | Thomson |
| 2,820,874 | A | | 1/1958 | Dunn |
| 3,098,927 | A | | 7/1963 | Onwy |
| 3,336,655 | A | * | 8/1967 | Rozmus ............... B23K 20/028 228/115 |
| 3,654,418 | A | | 4/1972 | Meacher |
| 3,705,973 | A | | 12/1972 | Balzer |
| 3,772,753 | A | * | 11/1973 | Sargeant .............. B23K 9/0282 228/48 |

(Continued)

*Primary Examiner* — Arthur O Hall
*Assistant Examiner* — Tuongminh Pham
(74) *Attorney, Agent, or Firm* — Fitch, Even, Tabin & Flannery LLP

(57) ABSTRACT

A wire butt welding apparatus includes at least two clamps, individual ones of the at least two clamps configured to hold a respective wire. The individual ones of the at least two clamps are positioned within the wire welder such that the ends of individual ones of the respective wires, when held by the respective clamps, will contact each other. One or more individual ones of the at least two clamps are associated with an adjustment axis about which the individual ones of the at least two clamps are configured to rotate. An adjustment mechanism is operatively coupled to fix one or more of the at least two clamps corresponding to the associated adjustment axis at an angular orientation with respect to a second clamp.

9 Claims, 16 Drawing Sheets

(56) References Cited

U.S. PATENT DOCUMENTS

| | | | |
|---|---|---|---|
| 4,001,543 A * | 1/1977 | Bove | B23K 26/067 |
| | | | 219/121.63 |
| 4,211,068 A | 7/1980 | Lange | |
| 5,734,142 A | 5/1998 | Kazmierczak | |
| 5,859,400 A | 1/1999 | Inagaki | |
| 6,031,197 A * | 2/2000 | Larsson | B23K 11/046 |
| | | | 219/101 |
| 6,708,964 B1 | 3/2004 | Dedrick | |
| 6,710,278 B2 | 3/2004 | Ritter | |
| 6,844,532 B2 | 1/2005 | Takamura et al. | |
| 7,753,629 B1 * | 7/2010 | McCulloch | B23Q 1/52 |
| | | | 108/7 |

\* cited by examiner

WIRE BUTT WELDER WITH ADJUSTABLE ALIGNMENT

CROSS-REFERENCE TO RELATED APPLICATIONS

The present application claims the benefit of the previously filed U.S. provisional application 61/791,371, filed on Mar. 15, 2013, which application is incorporated by reference in its entirety.

TECHNICAL FIELD

The invention relates generally to wire welding, and more specifically, to welding devices associated with wire bending machinery.

BACKGROUND

Wire butt welding equipment is generally known in the industry as a means for joining the ends of two or more wires, sometimes creating a closed wire figure. Wire welders use clamps to grasp the respective ends of wires to be welded together. The clamps hold the respective ends of the wires in contact with each other, and the welder applies a tip force to press the ends of the wires together. In a resistive wire welder, electrodes within the clamps contact the wire and pass current through the respective wires to be welded. The resistance at the juncture of the two wires causes a buildup of heat, which welds the wires together.

The wire butt welders known in the art are designed to weld straight pieces of wire. Wire welders associated with flexible wire bending machinery, however, must be capable of accommodating a variety of parts. Curved wires, wires with angled segments, or wires needing to be welded at an angle relative to each other (as opposed to forming a straight line with the two wire ends) require angular adjustment of the electrodes of the wire welder to properly align the ends of the wires. Known wire welders are designed with clamps that are not, themselves, capable of angular adjustment. Instead, the known wire welders rely upon electrodes that must be angularly adjusted. To accommodate this adjustment, the wire welders known in the art use electrodes with slotted mounting holes. An exemplary prior art electrode is illustrated in FIG. 13. The electrode 330 has grooves 331 and 332 positioned at either side of the electrode. The grooves 331 and 332 are substantially cylindrical such that they receive and maintain contact with the outer surface of a round wire. In a wire butt-welder, two electrodes 330 grasp each end of the respective wires that are to be welded by the welder. The electrodes 330 are positioned substantially opposite each other, across the centerline of the wire. A holding force clamps the wire between the electrodes 330. The electrode has a through-hole 334 used to locate or attach the electrode to a jaw of a wire butt-welder. In addition, the electrode has arc shaped slots 333 that facilitate angular adjustment of the electrodes relative to the clamps. By adjusting the angle of the electrodes 330, the ends of the wires to be welded can be aligned with one another.

Over time and repeated use, slotted electrodes slip relative to the clamps. Further, all types of electrodes accumulate build up due to welding material that has not been cleaned. This build-up affects the angular alignment of wires held by the electrodes 330. In addition, the electrodes 330 typically need to be adjusted every time the wire butt-welder is configured to run a different part. The electrodes are frequently adjusted to maintain proper alignment of the wire ends within the welder, particularly in situations where a welder runs high volumes of parts or parts requiring a variety of angular alignments. The slotted electrodes previously known in the art required individual adjustment—meaning each electrode needed to be adjusted by loosening bolts screwed through the slotted holes and manually changing the angle of the electrode. This process was difficult and time-consuming in part because the electrodes tend to slip when the bolts are re-tightened. The time required to adjust the electrodes reduces the productivity of the welding equipment. The adjustment and slippage also imparts mechanical wear on the electrodes, both at the wire/material interface surface with the electrodes and at the mounting surface of the electrode. Reducing the need for adjustment, or simplifying the process of adjusting electrodes, is therefore desirable.

Slotted, angularly adjustable electrodes are more expensive than similar electrodes that have a simple through-hole for fixed mounting to the clamp. Electrodes used in wire butt welders are a consumable part of the machine, due to the stresses imparted by high temperatures, electrical current, and mechanical wear. Reducing the cost of the electrodes used on the wire welder is therefore desirable.

SUMMARY

Generally speaking and pursuant to these various embodiments, a wire butt welding apparatus is provided that includes at least two clamps, each clamp comprising a first jaw and a second jaw. In a resistive wire welder, the respective jaws serve as an electrode configured to pass electrical current to the wires being welded. Individual ones of the respective jaws may have a groove configured to receive a wire. The at least two clamps are positioned within the wire welder such that the groove in the first jaw of individual ones of the at least two clamps is substantially transversely aligned with the groove of every other clamp, such that the respective ends of wires held by the respective clamps will contact each other. One or more individual ones of the at least two clamps are associated with an adjustment axis about which the individual ones of the at least two clamps are configured to rotate. An adjustment mechanism is operatively coupled to fix one or more of the at least two clamps corresponding to the associated adjustment axis at an angular orientation with respect to a second clamp.

The angular adjustment of the clamp, as a whole, means that the jaws within the clamp can be mounted at a fixed angle relative to the other clamp(s). This mounting configuration reduces the complexity and cost of the jaws because it eliminates the need for slotted mounting holes on the jaws. Using this mounting configuration, the jaws are less prone to slip relative to the clamps. In addition, the jaws are capable of passing greater forces to the wires by virtue of using simple through-holes to mount the jaws to the clamp. This serves the added benefit of imparting greater holding forces to the wires being welded, which reduces slippage of the wires within the jaws. The reduction in slippage of the wire and of the jaws also reduces the mechanical wear on the jaws and therefore increases their lifespan. This increases the productivity of the machine because the jaws need not be replaced as frequently.

In one described example, the adjustment mechanism further includes a threaded nut coupled to a lever arm. The threaded nut is configured to drive the lever arm, and the lever arm is configured to rotate one or more of the at least two clamps about the associated adjustment axis in response to movement of the lever arm. In this example, the adjustment mechanism may further include a threaded rod translationally fixed to the welding apparatus, the threaded rod configured to displace the threaded nut in response to rotation of the threaded rod. These elements can be manually or mechanically driven.

This adjustment mechanism simplifies changing the angular adjustment of the clamps. The mechanism therefore increases the overall productivity of the wire butt welder because less time is needed to adjust the machine when setting up the machine to run new parts, or when correcting the adjustment to accommodate ordinary wear on the jaws.

In other described examples, the wire butt welding apparatus further includes mechanisms for advancing and retracting the clamps, or for raising and lowering the clamps, or for translating the clamps toward or away from each other. These features enable the wire butt welding apparatus to grasp wires and weld them, maintaining the angular adjustment of the clamps.

BRIEF DESCRIPTION OF THE DRAWINGS

The above needs are at least partially met through provision of an adjustable butt welder described in the following detailed description, particularly when studied in conjunction with the drawings, wherein.

Figure 1:
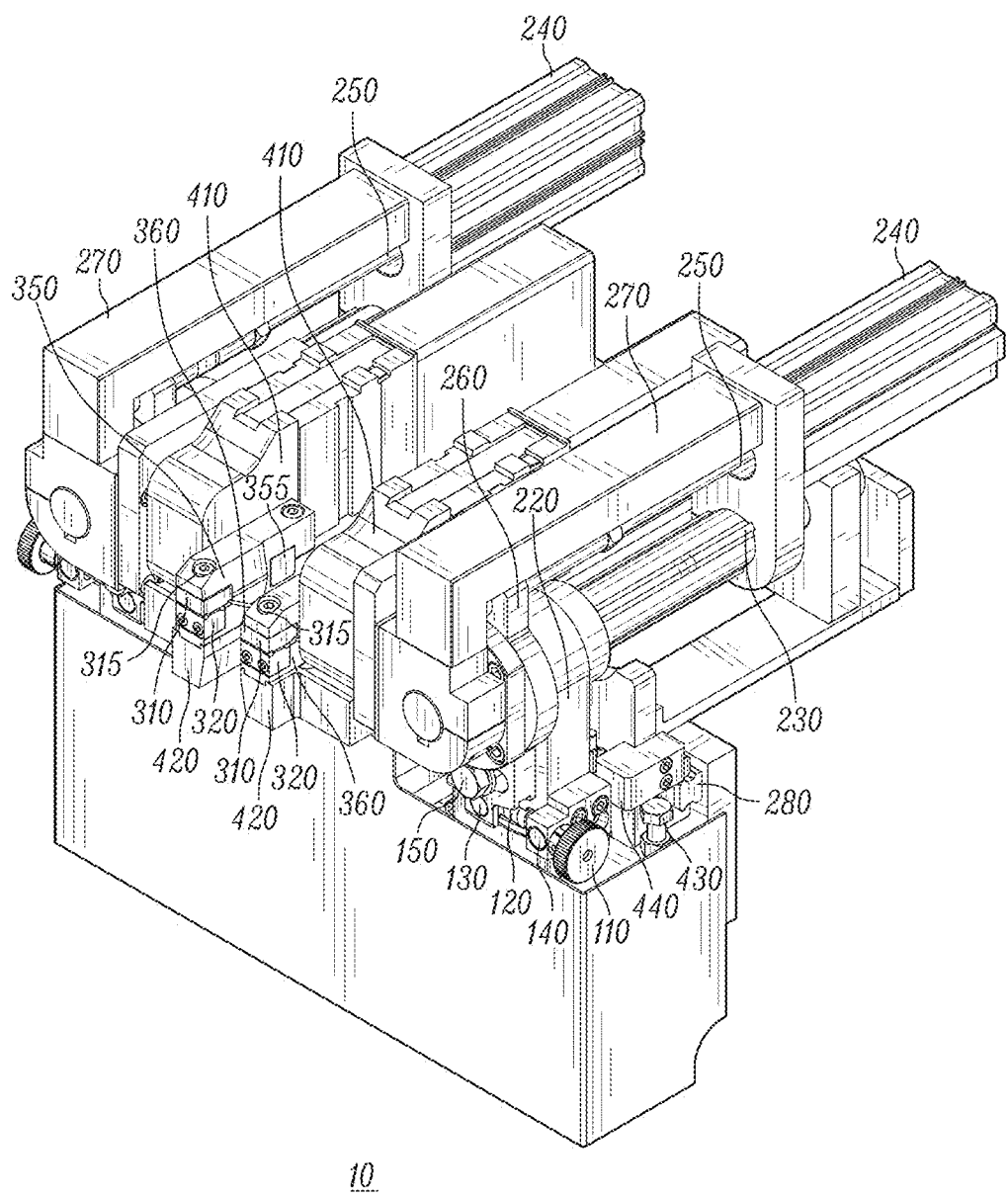
FIG. 1 comprises a perspective view of the wire butt welder, shown with welder head retracted and in a lowered position with the right clamp refracted away from the left clamp.
Figure 2:
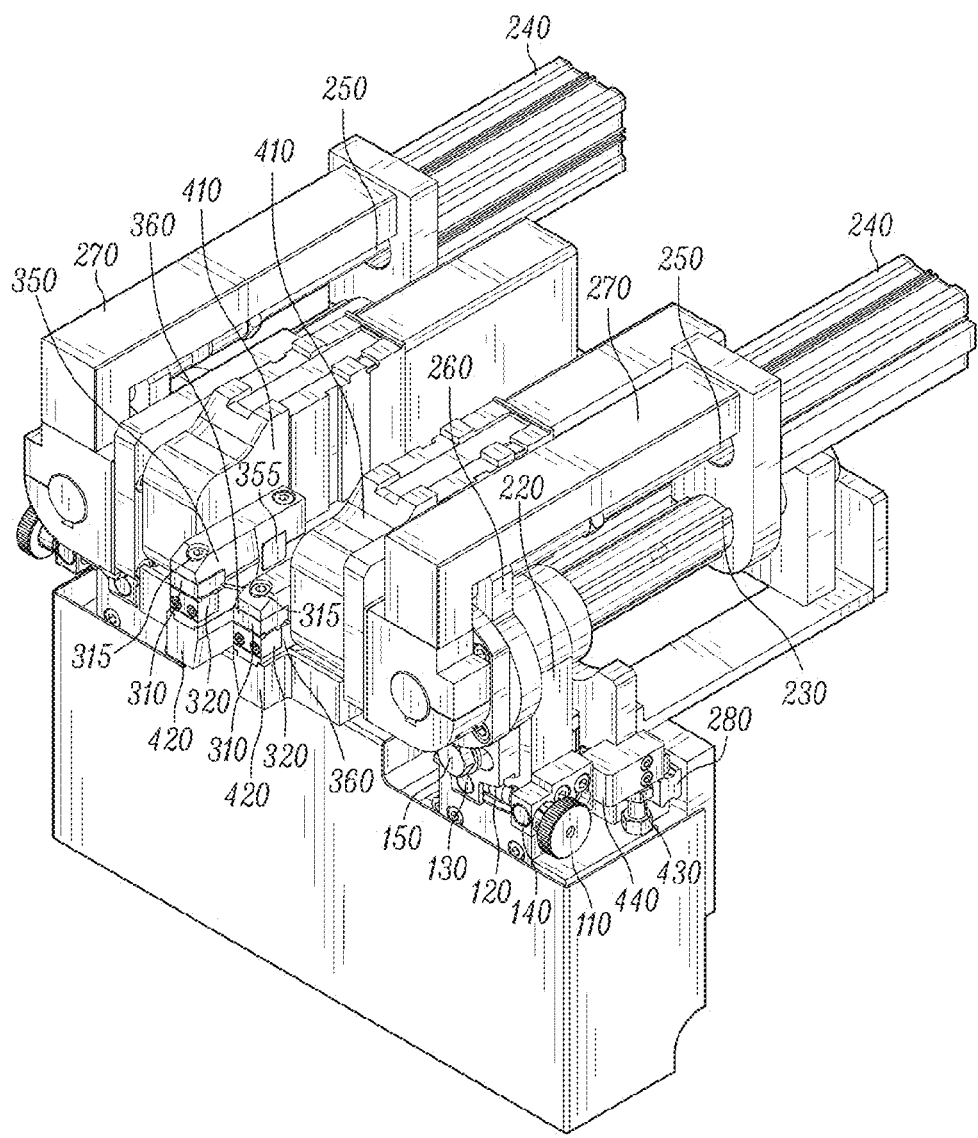
FIG. 2 comprises a perspective view of the wire butt welder, shown with welder head retracted and in a raised position with the right clamp retracted away from the left clamp.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In one embodiment, the wire butt welder is a welding unit that is placed in front of a steel wire bending machine. The wire butt welder is designed to operate in an automated fashion in concert with a wire bending machine. The wire butt welder is accordingly designed to produce high volumes of parts. This approach stands in contrast to many prior butt-welding devices, which are designed for manual operation in low volume operating environments. Aspects of the wire butt welder are designed for automation, starting with the ability to automatically pick parts from the wire bending machine, continuing with a programmable automatic weld cycle, and ending when the part is released from the welder. Automated wire bending machines are capable of forming a variety of wire sizes. The cross-sectional profile of the wire may be circular, oval, or multi-sided such as square. Other cross-sectional wire shapes are possible. In one embodiment, the wire butt welder is capable of joining two pieces of steel wire together through means of resistance welding. Resistance welding uses the parent material(s) to join the two pieces of wire together. The amount of current needing to be applied at a specific time (measured in cycles) is dependent on the thickness and conductivity of the material being welded.

FIGS. 1-10 illustrate an example of the adjustable welding mechanism. Elements of each drawing figure are numbered consistently throughout the figures. The adjustable welding mechanism consists of a left side clamping mechanism 300 and a right side clamping mechanism 301, as labeled on FIG. 9 and FIG. 10. The two clamping mechanisms 300 and 301 are substantially mirror images of one another for purposes of clamping and orienting wires to be butt welded together. The ends of two wires are held by the respective clamping mechanisms 300 and 301 during wire welding operations, such that the wires may be butt-welded together. To facilitate the butt-welding operation, the adjustable welding mechanism is designed such that the wires are substantially transversely aligned when clamped within the respective clamping mechanisms 300 and 301. The clamping mechanisms 300 and 301 include a top jaw 350 that pivots on the shaft 355 of an actuator 410, and a bottom jaw 360 that is rotationally fixed. The top jaw 350 receives a top electrode insert 310 that is further described in reference to FIG. 11A. The bottom jaw 360 receives a bottom electrode insert 320 that is further described in reference to FIG. 11B. Each of the electrodes 310 and 320 has a groove that receives the wire. When adjusted to create a straight wire weld, the grooves in the respective electrodes 310 and 320 of the respective clamping mechanisms 300 and 301 are substantially parallel and coincident.

The top electrode insert 310 is secured to the top jaw 350 by a bolt 315 that passes through the top jaw 350 and engages threads cut in the top electrode insert 310. The bottom electrode insert 320 is secured to the bottom jaw 360 by a pair of bolts 325 (see FIGS. 9 and 10) that pass through the bottom electrode insert 320 and engage threads cut in the bottom jaw 360. Many alternative means of securing the top electrode inserts 310 and the bottom electrode inserts 320 could be implemented, as will be appreciated by a person having ordinary skill in the art. The electrode inserts 310 and 320 are designed as consumable parts within the adjustable welder and should preferably be easy to replace and align within the welder.

Figure 3:
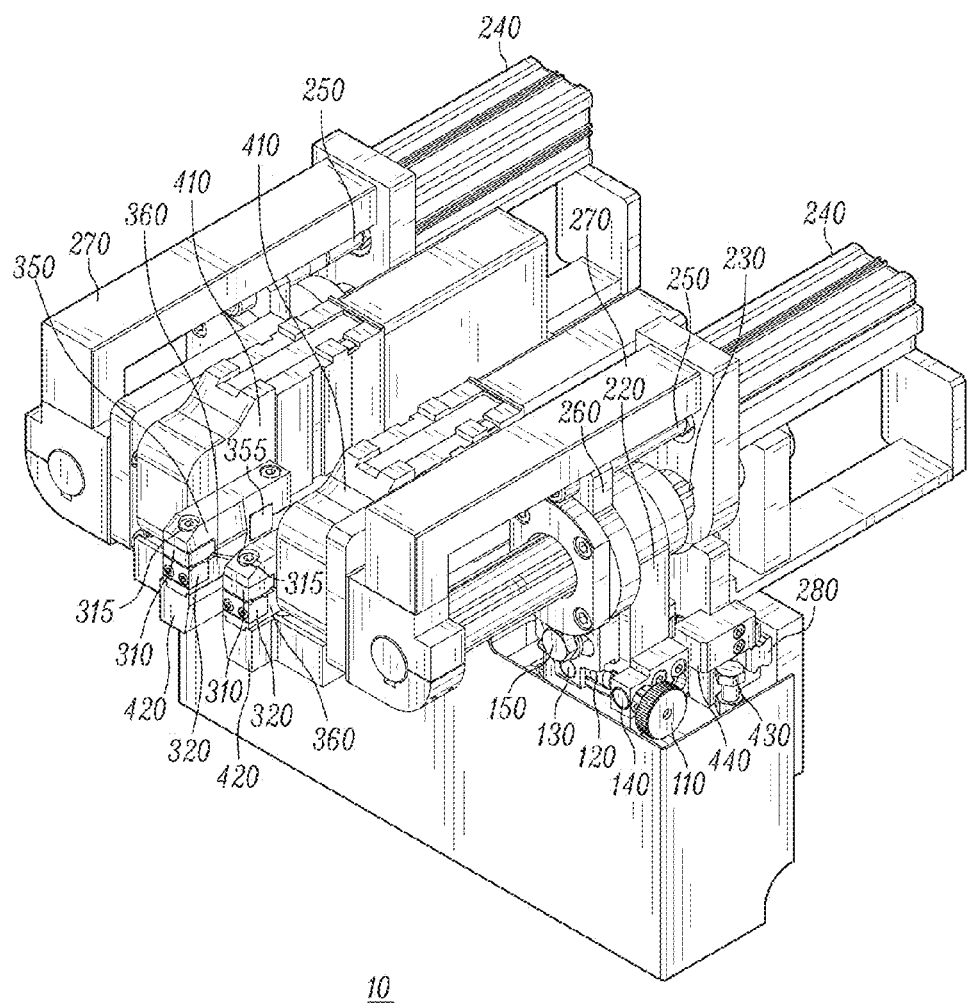
FIG. 3 comprises a perspective view of the wire butt welder, shown with welder head advanced and in a lowered position with the right clamp refracted away from the left clamp.
Figure 4:
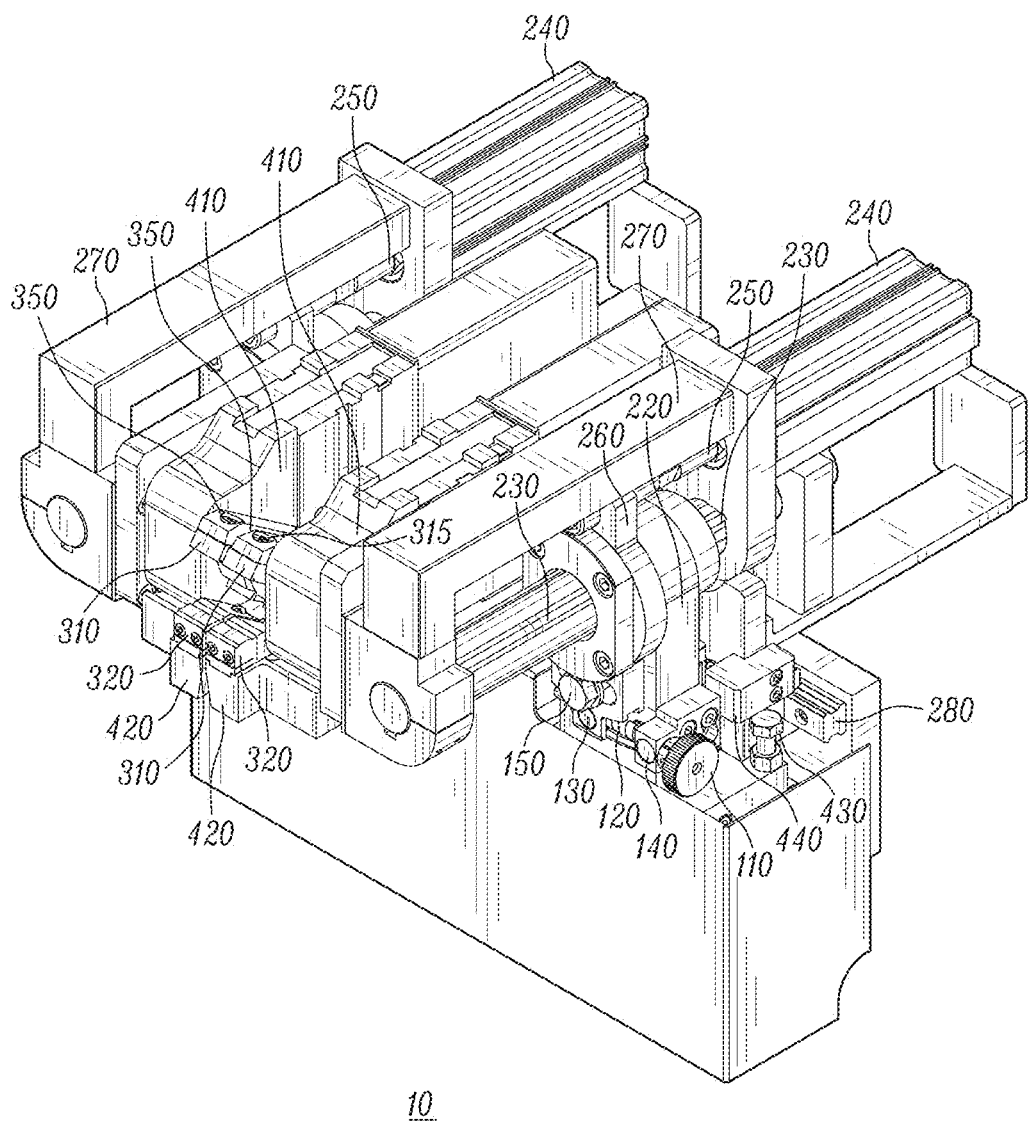
FIG. 4 comprises a perspective view of the wire butt welder, shown with welder head advanced and in a lowered position with the right clamp advanced towards the left clamp, and with both clamps opened.

The two top welding jaws 350 open and close relative to the bottom jaw 360 when the shaft 355 is rotated by the actuator 410. FIG. 4 illustrates the clamps in an open position, and the remaining FIGS. 1-3 and FIGS. 5-10 illustrate the clamps in a closed position in which the clamps grip and hold the wire. The jaws 350 and 360 open as illustrated in FIG. 4 so that the clamping mechanisms 300 and 301 may respectively receive wires to be welded. When closed, the jaws 350 and 360 securely hold and align wires to be welded. The actuator 410 applies a holding torque to the shaft 355, such that the clamps apply a holding force to the wire via the top electrode inserts 310 and the bottom electrode inserts 320. This holding force is sufficient to prevent the wire from sliding between the electrode inserts 310 and 320 when a tip force is applied to weld the ends of the wires together.

Figure 5:
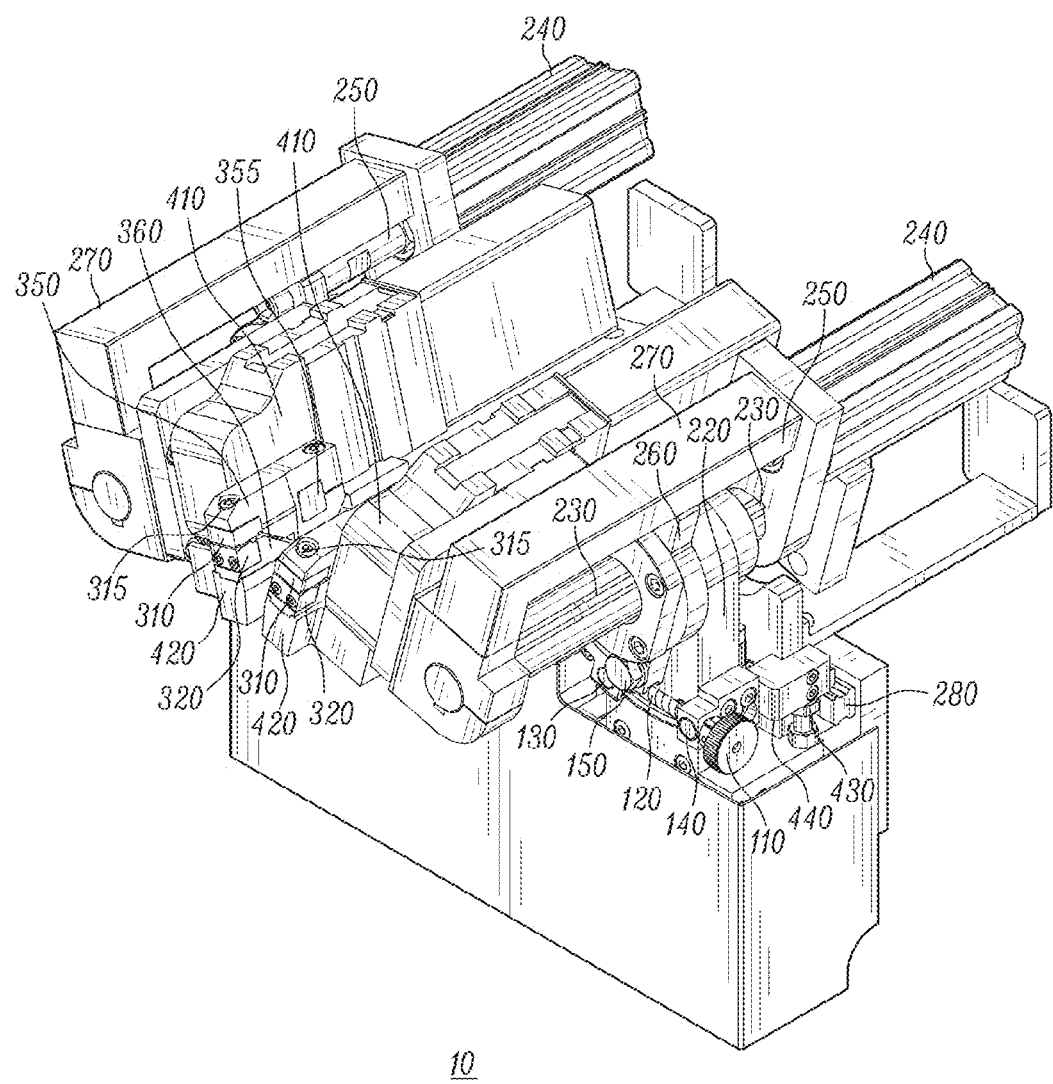
FIG. 5 comprises a perspective view of the wire butt welder, shown with welder head advanced and in a raised position where the clamps have been adjusted to have a convex angle.
Figure 6:
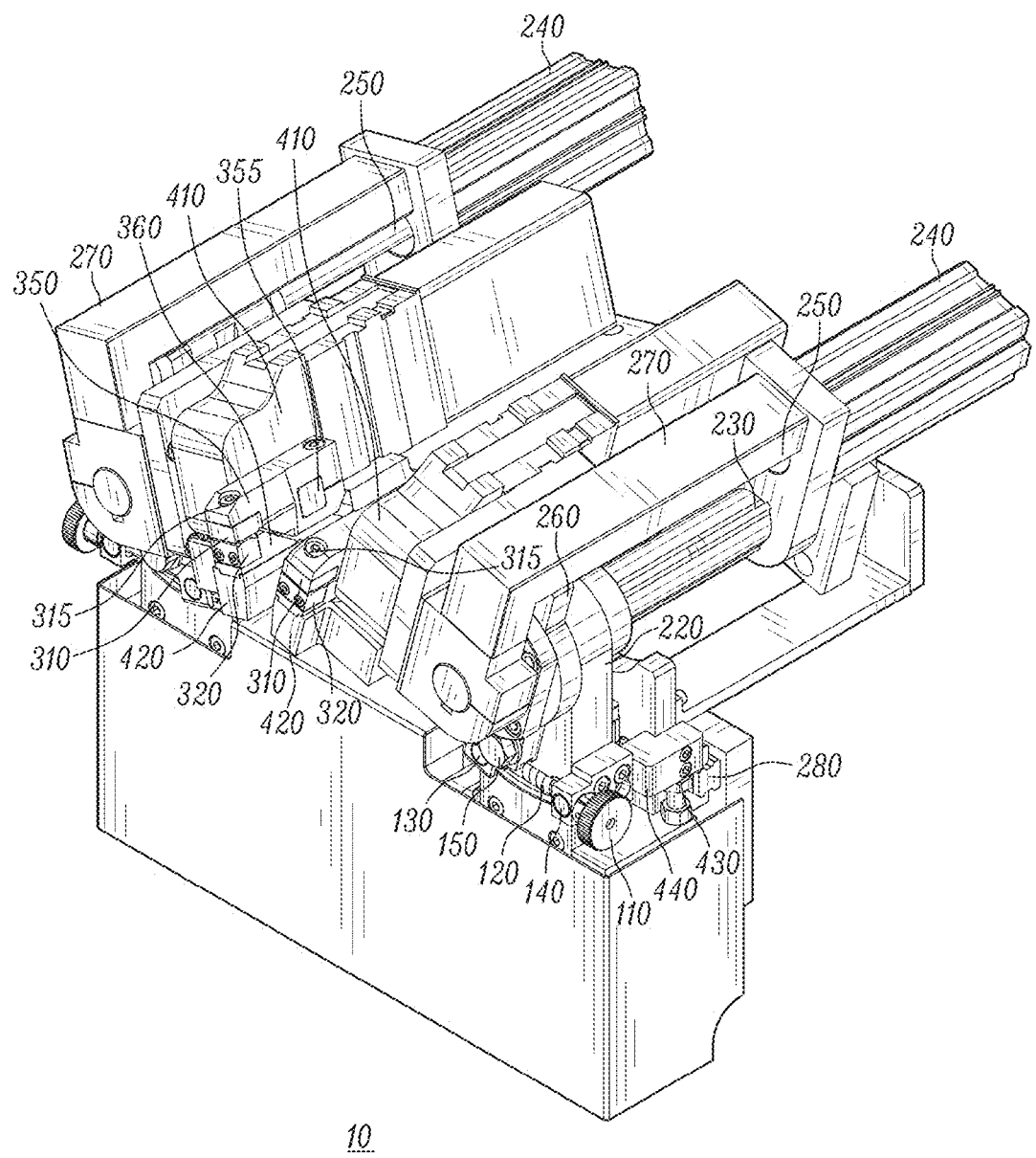
FIG. 6 comprises a perspective view of the wire butt welder, shown with welder head retracted and in a raised position where the clamps have been adjusted to have a convex angle.
Figure 7:
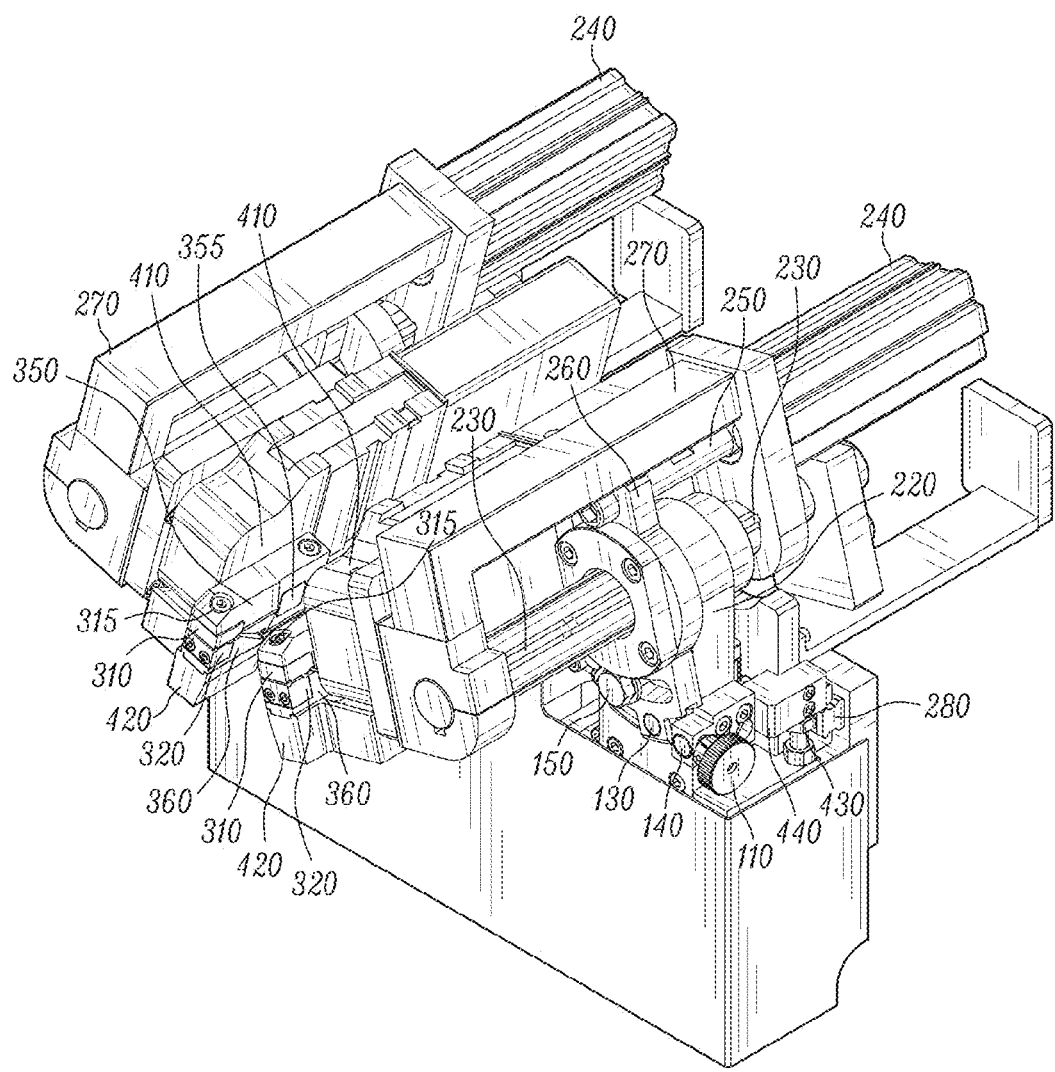
FIG. 7 comprises a perspective view of the wire butt welder, shown with welder head advanced and in a raised position where the clamps have been adjusted to have a concave angle.
Figure 8:
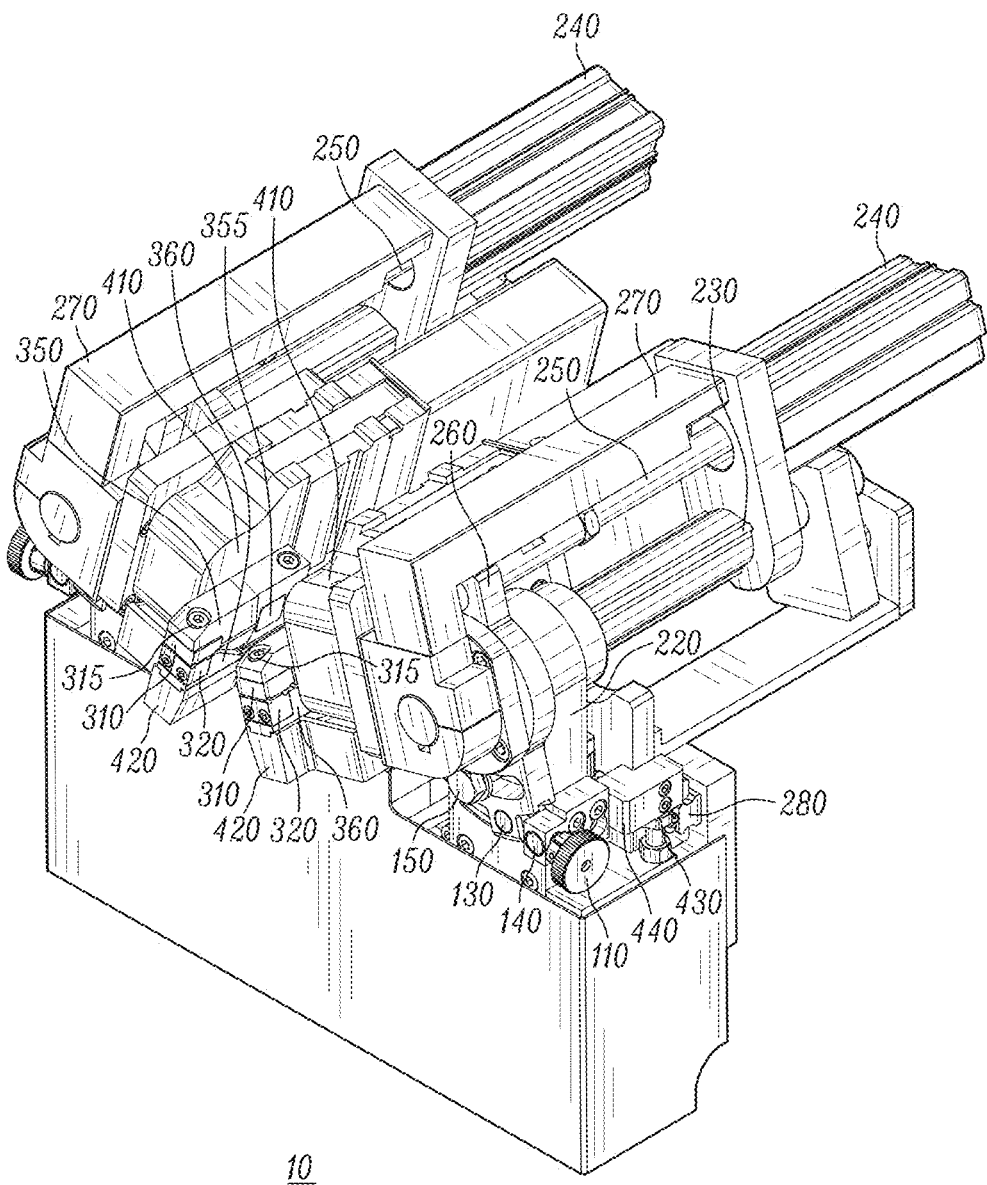
FIG. 8 comprises a perspective view of the wire butt welder, shown with welder head retracted and in a raised position where the clamps have been adjusted to have a concave angle.

The welder head traverses forward to retrieve a wire frame from the machine. FIGS. 3-5, and FIG. 7 illustrate the welder head at an advanced position and FIG. 1, FIG. 2, FIG. 6 and FIG. 8 illustrate the welder head at a retracted position. The clamping mechanisms 300 and 301 are advanced and retracted by pneumatic actuators 240 that drive a piston 250 against a collar 260. All components of the clamping mechanisms 300 and 301, including at least the jaws 350 and 360 and the actuators 410, are fixed to a support structure 270 that advances and retracts relative to a fixed element 220. The collar 260 interacts with a spline shaft 230 to maintain the angular alignment of the clamping mechanism at all positions between a retracted position and an advanced position. As will be observed in FIGS. 5 and 7, the spline shaft 230 advances through the collar 260 as the clamping mechanism moves to the advanced position. By comparison, FIGS. 6 and 8 show the spline shaft 230 retracted. To advance the clamping mechanisms 300 and 301, the piston 250 pulls the collar 260 towards the pneumatic actuator 240. When pulled by the piston 250, the collar 260 engages the fixed element 220 to drive the clamping mechanism 300 or 301 forward. To retract the clamping mechanisms 300 and 301, the piston 250 pushes the collar 260 away from the pneumatic actuator 240. When pushed by the piston 250, the collar 260 pulls against the fixed element 220 to drive the clamping mechanism 300 or 301 backward.

The welding electrodes 310 and 320 (4 in a set) that hold the wire during the welding procedure bolt onto the welding jaws 350 and 360. Copper contact bars 420 are stationary, and when in contact with the welding clamps 360, they provide the electrical current needed to weld. Due to heat and electrical current generated during butt welding operations, the electrode inserts 310 and 320 will accumulate build-up of welding material. Cleaning the electrode inserts 310 and 320, which is required to remove this build-up, will eventually degrade the shape of the inserts 310 and 320. As they degrade in this fashion, the electrode inserts 310 and 320 become less efficient at passing current to wires held within the electrodes. In addition, degraded electrode inserts 310 and 320 require a greater holding force to prevent the wire from sliding within the electrode inserts 310 and 320 when a tipping force is applied to weld the wires.

Figure 9:
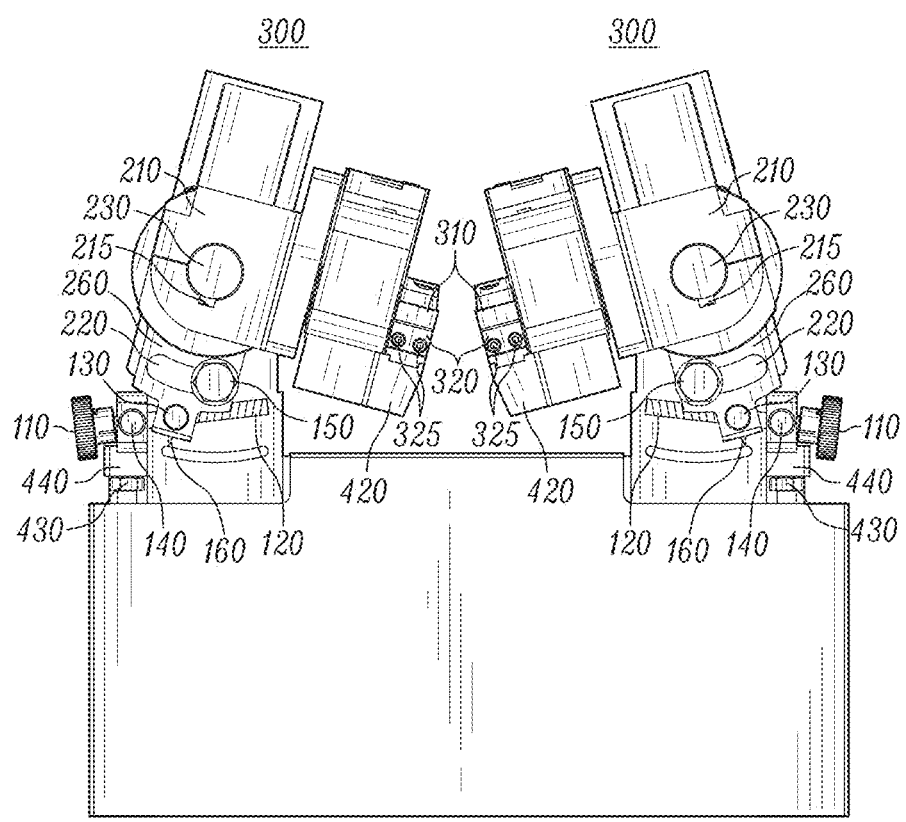
FIG. 9 comprises a front view of the wire butt welder, shown with clamps in a raised position where the clamps have been adjusted to have a concave angle.
Figure 10:
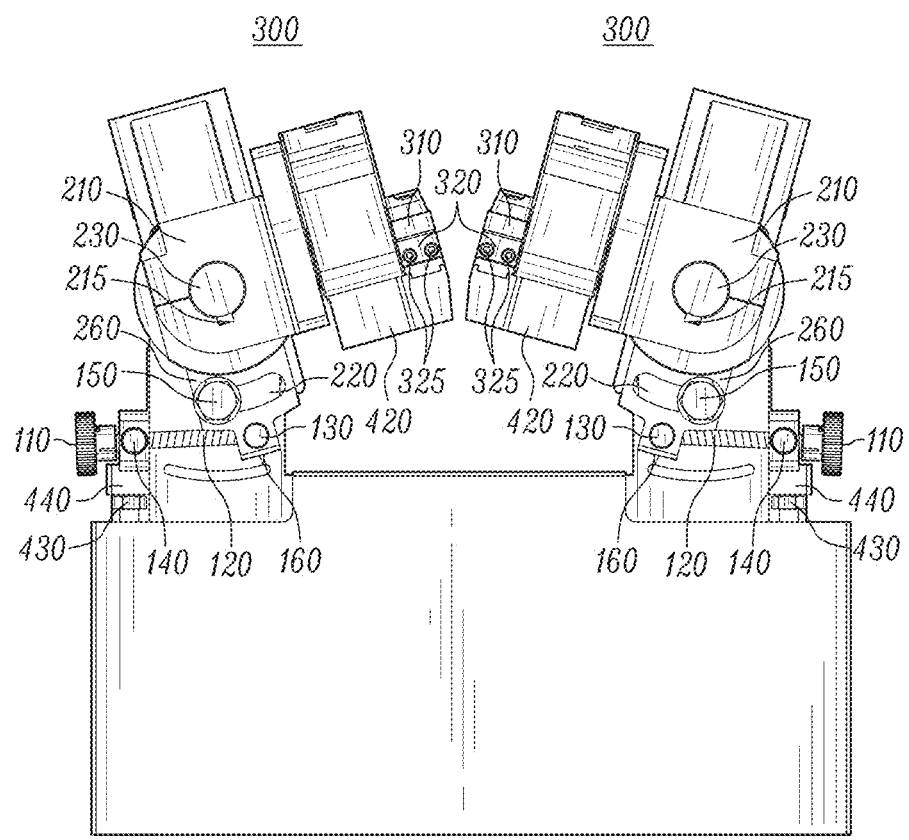
FIG. 10 comprises a perspective view of the wire butt welder, shown with clamps in a raised position where the clamps have been adjusted to have a convex angle.

To accommodate changes in the electrodes due to material build-up and also to address the different angular alignment required by different parts, the wire butt-welder allows for adjustment of the wire angle. FIGS. 5-6 and FIG. 10 illustrate the wire butt-welder adjusted to create a convex angle (creating a peak shaped like the letter "A") between the two wires to be welded. FIGS. 7-9 illustrate the wire butt-welder adjusted to create a concave angle (creating a valley shaped like the letter "V") between the two wires to be welded. By changing the angle of the wires, the wire butt-welder can accommodate curved wires such as rings, wires with angled segments, or wires needing to be welded at an angle relative to each other (as opposed to forming a straight line with the two wire ends), which require angular adjustment of the electrodes of the wire welder to properly align the ends of the wires. The adjustability of the angle also allows the machine operator to fine tune the orientation of parts either during setup or in between welding operations. This fine tuning capability allows the operator to manufacture parts consistently at tighter tolerances—specifically, the adjustable wire welder is capable of manufacturing smaller circular rings than prior art devices because it is capable of holding the tighter tolerances associated with these smaller rings.

In one example, the butt welder has a pair of knobs 110 associated with the left and right clamping mechanisms 300 and 301. The knobs 110 are connected to respective threaded rods 120. Turning the knob 110 turns the threaded rod 120 and causes a threaded nut 130 to travel along the length of the threaded rod 110. The threaded rod 110 is affixed at one end in a thrust bearing mechanism 140 to a rotationally fixed element 220 of the clamping mechanism 300 or 301. The travel of the threaded nut 160 causes the clamping mechanism 300 or 301 to rotate relative to the welder head on an axis defined by the splined shaft 230, which is keyed 215 to a bracket 210 that supports the actuator 410 and the clamps 350 and 360. The threaded nut 260 is mounted to a structure extending from the collar 260, such that the collar 260 pivots the clamping mechanism 300 or 301 along an adjustment axis defined by the splined shaft 230. The collar 260 therefore provides a lever arm that defines the angular adjustment of the clamping mechanisms 300 and 301. An indicator 160 protrudes at the end of the lever arm to indicate the angle of the clamping mechanism 300 or 301. A locking nut 150 rides an arc slot 220 cut in the collar 260. By tightening the locking nut 150, the angle of the clamping mechanism 300 or 301 is fixed. FIGS. 9 and 10 illustrate a front view of the welding head and illustrate the clamping mechanisms 300 and 301 at two different angles of rotation.

Other mechanisms including, but not limited to, different configurations of the threaded rod and the lever arm could be used to manipulate the clamp's angle. In addition, the angular adjustment may be driven by a variety of powered motors or actuators, including pneumatic, hydraulic, or electric actuators as would be understood by a person having ordinary skill in the art.

The clamping mechanisms 300 and 301 may be raised and lowered to retrieve wires from a wire forming machine. FIG. 1, FIG. 3, and FIG. 4 illustrate the welder head in a lowered position and FIG. 2, and FIGS. 5-10 illustrate the welder head in a raised position. The welder heads are raised and lowered by pneumatic cylinders (not shown) that push the heads upwards until an adjustable bumper 430 hits a stop 440. Other examples might use hydraulic or electrical actuators to raise and lower the clamping mechanisms 300 and 301.

A tip force is applied to the wires to be butt welded by a tip force/retract cylinder (not shown). In the illustrated example, tip force/retract cylinder is a pneumatic actuator. The tip force and retract pressure are controlled by a pressure gauge mounted on side of the welder (not shown). The tip force pushes the ends of the wires together during a welding operation. Other examples might use hydraulic or electrical actuators to achieve the tip force. The tip force draws the two clamping mechanisms 300 and 301 together. FIG. 4 illustrates the clamping mechanisms 300 and 301 at a position drawn together, as compared to FIG. 3 in which the clamping mechanisms are spread apart from one another. In the illustrated example, the right side clamping mechanism 301 is mounted on a track 280 such that the clamping mechanism 301 as a whole is translated by the tip force/retract cylinder. In alternative examples, the two clamping mechanisms 300 and 301 could be configured to move differently by moving either or both of the clamping mechanisms 300 and 301.

Figure 11A:
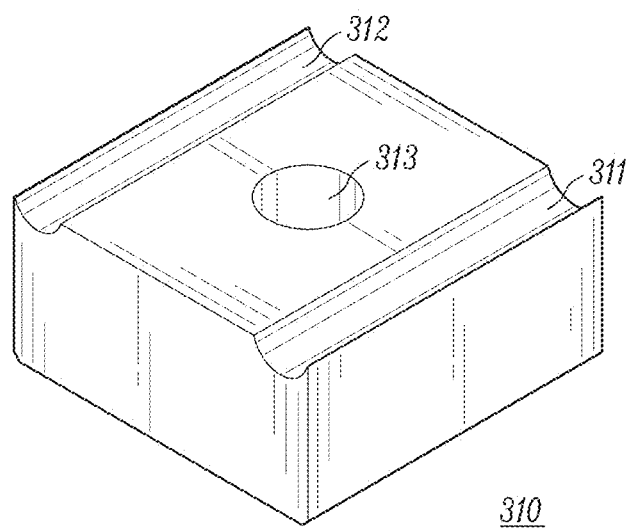
FIG. 11A comprises a perspective view of the top electrode insert of the wire butt welder.

FIG. 11A illustrates an example top electrode insert 310 in detail. Two grooves 311 and 312 appear on the same face of the top electrode insert 310. Electrodes may also be custom designed with curved or angled grooves 311 and 312 to accommodate curved wires such as rings or for wires formed with angled segments. The grooves 311 and 312 may be selected to secure the wire by unscrewing the top electrode insert 310, rotating the insert 180 degrees, and then re-screwing the insert to the top clamp 350. In one example, the grooves 311 and 312 are the same size, which allows a machine operator to rotate the insert 310 to use a fresh groove after the first groove has degraded. In another example, the groove 311 has a different radius from the groove 312. The groove 311 may match the diameter of a first size of wire, while the groove 312 may match the diameter of a second size of wire, which allows a machine operator to select a groove based on the wire to be welded by the adjustable welding apparatus. A threaded through-hole 313 extends through the top electrode insert 310, such that the bolt 315 can be threaded to the insert 310.

Figure 11B:
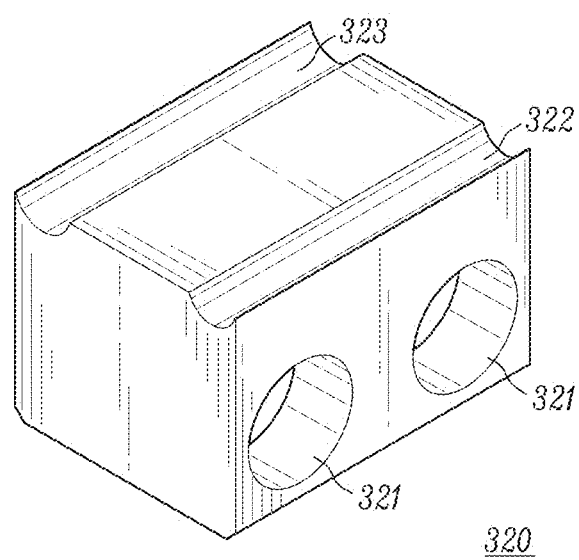
FIG. 11B comprises a perspective view of the bottom electrode insert of the wire butt welder.

FIG. 11B illustrates an example bottom electrode insert 320 in detail. Two grooves 322 and 323 appear on the same face of the bottom electrode insert 320. Electrodes may also be custom designed with curved or angled grooves 322 and 323 to accommodate curved wires such as rings or for wires formed with angled segments. In one example, the grooves 322 and 323 are the same size, which allows a machine operator to rotate the insert 320 to use a fresh groove after the first groove has degraded. In another example, the groove 322 has a different radius from the groove 323. The groove 322 may match the diameter of a first size of wire, while the groove 323 may match the diameter of a second size of wire, which allows a machine operator to select a groove based on the wire to be welded by the adjustable welding apparatus. Counter-sunk through holes 321 are designed to fit cap screws 325 that secure the bottom electrode insert 320 to the bottom clamp 360. The welding inserts 310 and 320—and specifically the grooves 311, 322, 312, and 323—must be properly dressed between jobs or when considerable build up is noticed.

Figure 11C:
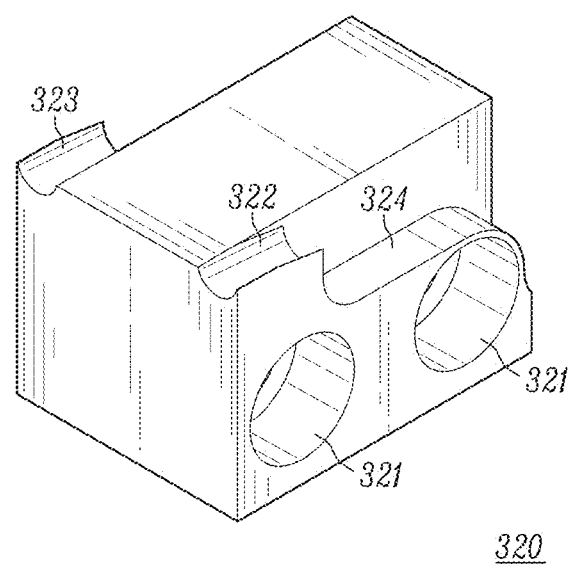
FIG. 11C comprises a perspective view of an alternative bottom electrode insert of the wire butt welder, for use with curved wires or rings.

FIG. 11C illustrates the details of an example bottom electrode 320 for use with curved wires or rings. Two grooves 322 and 323 are provided to support a wire. In the example illustrated in FIG. 11C, the grooves 322 and 323 are angled and slightly curved to support a curved wire ring. As with the example illustrated in FIG. 11B, the bottom electrode illustrated in FIG. 11C is reversible to provide double the longevity of the tooling, in the instance where the grooves 322 and 323 are the same size, or for use with differently sized wire, in the instance where grooves 322 and 323 match the respective wires. To provide clearance for the curved wire, the grooves 322 and 323 are shortened, and material is removed from a clearance region 324. Counter-sunk through holes 321 are designed to fit cap screws 325 that secure the bottom electrode insert 320 to the bottom clamp 360.

Figure 12:
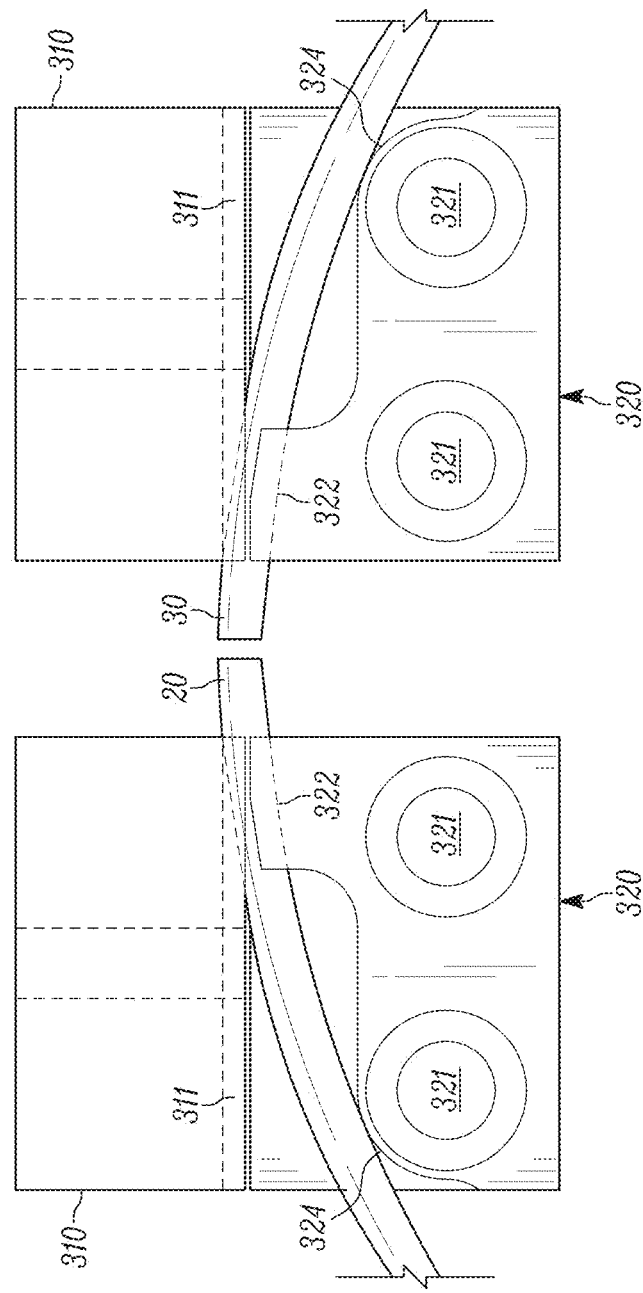
FIG. 12 comprises a schematic illustration of the alternative bottom electrode inserts from FIG. 11C and the top electrode from FIG. 11A with wires in place.

FIG. 12 illustrates the bottom electrodes from FIG. 11C and the top electrodes from FIG. 11A, in use with a first wire end 20 and a second wire end 30. The electrode 310 and 320 clamp the respective ends of the wire. The clearance region 324 of the bottom electrode 320 leaves space for the wire to pass around the screws 325 that secure the bottom electrode to the lower jaw 360.

When setting up the adjustable wire welder the welder must be aligned with reference to the bending unit on the wire forming machine. When picking up a wire, there should be equal spacing between the ends of the wire and the clamps on both sides of the wire, i.e., from the butt weld to each electrode. Depending on the wire size or required weld type the welder has to grip the wire closer or further away from the ends of wire on formed part. The entire butt welder should be moved left or right to achieve equal spacing. The welder head may be manually advanced to make it easier to see the spacing between the wire ends and the electrodes.

The next step would be aligning welder heights to the wire forming machine. In addition, when changing the tools from one wire gauge to another there will be a height variation on the left pick-up cylinder.

Figure 13:
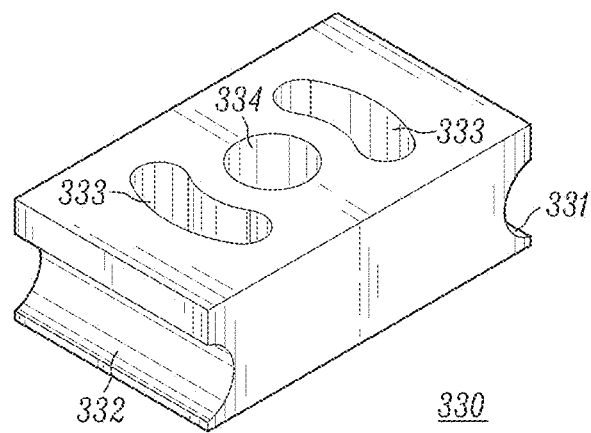
FIG. 13 comprises a perspective view of the electrode from a prior art wire butt welder, illustrating slotted adjustment channels machined into the jaw.
Figure 14:
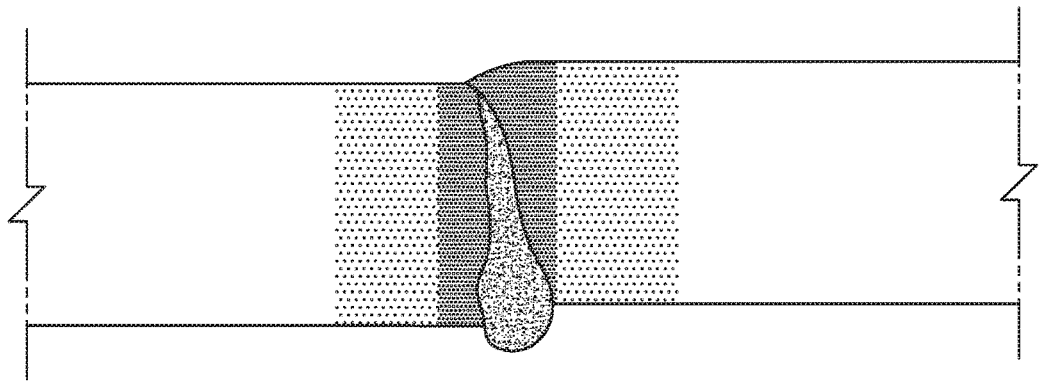
FIG. 14 illustrates misalignment of two wires.

Next, adjusting the clamps facilitates achieving a straight weld or a weld with the desired angle. This is accomplished by loosening the locking nut 150 and turning the knob 110 on the clamp's angular adjustment mechanism. As shown in FIG. 13, the weld is not straight and needs to be adjusted to form a straight part. Over time, the welding electrodes will accumulate build up due to welding material that has not been cleaned; this will cause angular misalignment. Typical practice is to "prep" the electrodes between wire changes and jobs with an electrode dressing tool with the proper face contour covered with a very fine polishing cloth of 280-grit abrasive coarseness. Over time, however, the electrodes will inevitably degrade somewhat and may need further angular adjustment.

The left and right clamping mechanisms 300 and 301 are independently adjustable, to allow simple setup and angular adjustment of the welding assembly. This allows the machine operator to first square the left side 300 in relation to a wire forming machine (not shown). After the left side is adjusted to the position of the wire on the machine, adjustments to align the wires should only be made to the right side 301.

During operation, the following issues might arise. If the welds are inconsistent, typically the welder is not applying enough clamp pressure or tip force is too high or too low. Another cause of inconsistent welds is if the electrodes are slipping on the wire when applying tip force. Excessive spark expulsion while welding is frequently caused by a tip force that is too low or too much heat and too little weld time. A welded part that does not have an even weld is often caused by fouling of the electrodes. To cure this problem, the operator must clean the electrodes and/or adjust the angle of the electrodes.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A wire butt welding apparatus configured to weld a first wire end to a second wire end by applying a tip force and an electric current through the first wire end to the second wire end when the first wire end is secured in a first clamp and the second wire end is secured in a second clamp, the apparatus comprising;
    a first fixed element; a second fixed element slidable relative to the first fixed element and configured to be actuated by a squeeze mechanism having an adjustable length, the squeeze mechanism coupled at a first end to the second fixed element, wherein the squeeze mechanism is configured to apply the tip force through the second fixed element to the first fixed element;
    the first clamp mounted at a distal end of a first shaft, the first shaft configured to be slidable and rotatable relative to the first fixed element, the first clamp comprising a first jaw and a second jaw, the first jaw having a first groove configured to receive the first wire end;
    the second clamp mounted at a distal end of a second shaft, the second shaft configured to be slidable relative to the second fixed element, the second clamp comprising a third jaw and a fourth jaw, the third jaw having a second groove configured to receive the second wire end; the first clamp and the second clamp positioned such that the first groove is substantially transversely aligned with the second groove; the first clamp associated with an adjustment axis about which the first clamp and the first shaft are configured to rotate relative to the first fixed element;
    an advancement mechanism having an adjustable length and comprising an advancement actuator, the advancement mechanism coupled at a first end to the first clamp, the advancement mechanism configured to slide the first clamp relative to the first fixed element along the adjustment axis; and
    an adjustment mechanism having an adjustable length and coupled at a first end to a first lever arm that is coupled to the first clamp, the adjustment mechanism configured to fix the first clamp at an angular orientation with respect to the second clamp, and the adjustment mechanism further configured to drive the first lever arm when the adjustable length of the first adjustment mechanism changes and therefore rotate the first clamp about the adjustment axis.

2. The apparatus of claim 1 wherein the adjustment mechanism further comprises a threaded nut configured to drive the lever arm to rotate the first clamp about the adjustment axis.

3. The apparatus of claim 2 further comprising a threaded rod translationally fixed to the first fixed element, the threaded rod configured to displace the threaded nut in response to rotation of the threaded rod.

4. The apparatus of claim 1 further comprising:
    a second advancement mechanism having an adjustable length and comprising a second advancement actuator, the second advancement mechanism coupled at a first end to the second clamp, wherein a change in the adjustable length of the second advancement mechanism is configured to slide the second clamp relative to the second fixed element along the adjustment axis.

5. The apparatus of claim 1 further comprising:
    a machine base, wherein the second fixed element is slidable relative to the machine base;
    a lift mechanism having an adjustable length and comprising a lift actuator, the lift mechanism coupled at a first end to the machine base and coupled at a second end to the first fixed element, wherein a change in the adjustable length of the lift mechanism is configured to raise or lower the first clamp relative to the machine base.

6. The apparatus of claim 1 further comprising a jaw opener mechanism coupled to the first clamp and configured to displace at least one of the first jaw and the second jaw of the first clamp.

7. The apparatus of claim 1 wherein the adjustment mechanism further comprises a motor configured to change the adjustable length of the adjustment mechanism, and thereby to adjust the angular orientation of the first clamp with respect to a second clamp.

8. The wire butt welding apparatus of claim 1, further comprising:
    a first collar with teeth interlocking a spline along the first shaft, the first collar coupled to the first lever arm and configured to rotate the first shaft relative to the first fixed element.

9. The wire butt welding apparatus of claim 1, further comprising:
    a second collar with teeth interlocking a spline along the second shaft;
    a second adjustment mechanism having an adjustable length and coupled at a first end to a second lever arm that is coupled to the second collar, the adjustment mechanism configured to fix the second clamp at an angular orientation with respect to the first clamp, and the adjustment mechanism further configured to drive the first lever arm when the adjustable length of the first adjustment mechanism changes and therefore rotate the first clamp about the adjustment axis.

* * * * *